United States Patent
Wang

(10) Patent No.: US 8,991,572 B2
(45) Date of Patent: Mar. 31, 2015

(54) LEAK-PROOF DAMPER HAVING SELF-DIAGNOSTIC FEATURE

(75) Inventor: Wenshui Wang, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 1153 days.

(21) Appl. No.: 12/553,133

(22) Filed: Sep. 3, 2009

(65) Prior Publication Data

US 2011/0048879 A1 Mar. 3, 2011

(51) Int. Cl.
*F16F 9/36* (2006.01)

(52) U.S. Cl.
CPC .............. *F16F 9/36* (2013.01); *F16F 2230/10* (2013.01); *F16F 2230/24* (2013.01)
USPC ........... 188/322.17; 188/315; 92/5 R; 92/256; 277/353

(58) Field of Classification Search
CPC .. F16F 9/362; F16F 2230/24; Y10S 277/928; Y10S 277/929
USPC ............. 188/318, 322.16–322.19, 313–315; 277/353, 551, 572, 573, 575, 576, 928, 277/929, 320; 92/5 R, 256, 165 R, 166, 168, 92/66
See application file for complete search history.

(56) References Cited

U.S. PATENT DOCUMENTS

| | | | |
|---|---|---|---|
| 4,795,009 A | 1/1989 | Tanahashi et al. | |
| 4,896,890 A * | 1/1990 | Mauney | 277/408 |
| 5,176,229 A * | 1/1993 | Kanari et al. | 188/322.17 |
| 5,467,971 A | 11/1995 | Hurtubise et al. | |
| 6,158,559 A * | 12/2000 | Asa et al. | 188/322.17 |
| 6,241,252 B1 * | 6/2001 | Jump et al. | 277/353 |
| 6,622,832 B2 * | 9/2003 | Ashiba et al. | 188/322.17 |
| 7,770,897 B2 * | 8/2010 | Berdichevsky | 277/551 |
| 2002/0063024 A1 * | 5/2002 | Ashiba et al. | 188/322.17 |
| 2003/0024780 A1 * | 2/2003 | Yasuda | 188/322.17 |

FOREIGN PATENT DOCUMENTS

| | | |
|---|---|---|
| DE | 102005041230 A1 | 3/2007 |
| DE | 102009025142 A1 | 12/2010 |
| DE | 102009030591 A1 | 2/2011 |
| GB | 2067262 * | 1/1980 |
| JP | 04024630 A | 1/1992 |
| JP | 2008215457 A | 9/2008 |

OTHER PUBLICATIONS

German Office Action dated Jun. 3, 2014 for German patent application 102010035576.3, corresponding to U.S. Appl. No. 12/553,133.

* cited by examiner

*Primary Examiner* — Vishal Sahni

(57) ABSTRACT

A leak-proof damper with a self-diagnostic feature. An auxiliary oil reservoir body is disposed externally with respect to the damper cylinder and generally adjacent the rod seal, wherein the auxiliary oil reservoir body is concealed by an end cap. The maximum volume of oil retainable by the auxiliary oil reservoir body is predetermined to coincide with a volume of oil which may be lost from the interior of the damper cylinder and yet the damper will still function properly. The auxiliary oil reservoir body may be a seal body having an internal cavity providing an oil retention volume or an absorbent body having an absorbency capacity that provides an oil retention volume.

7 Claims, 5 Drawing Sheets

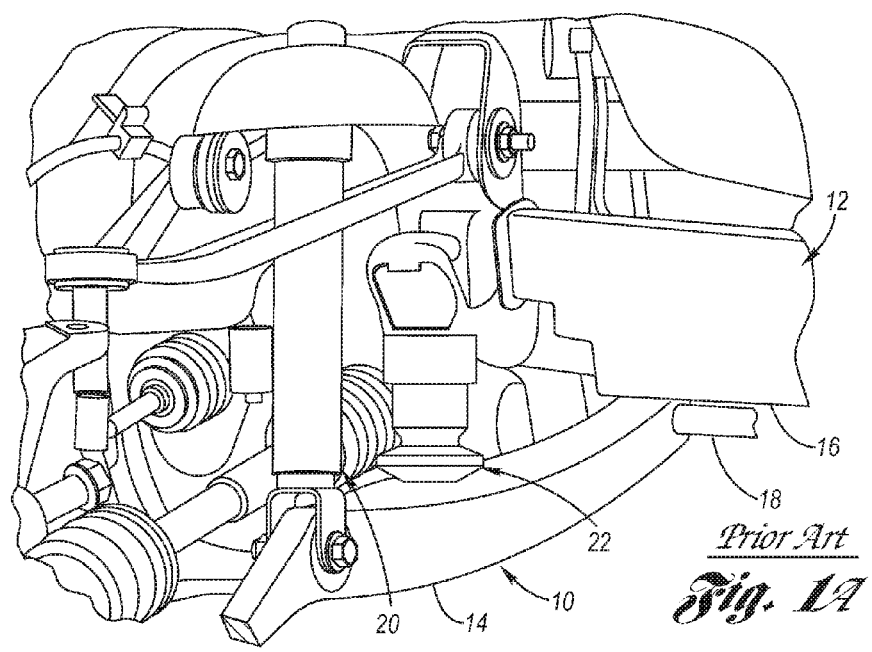
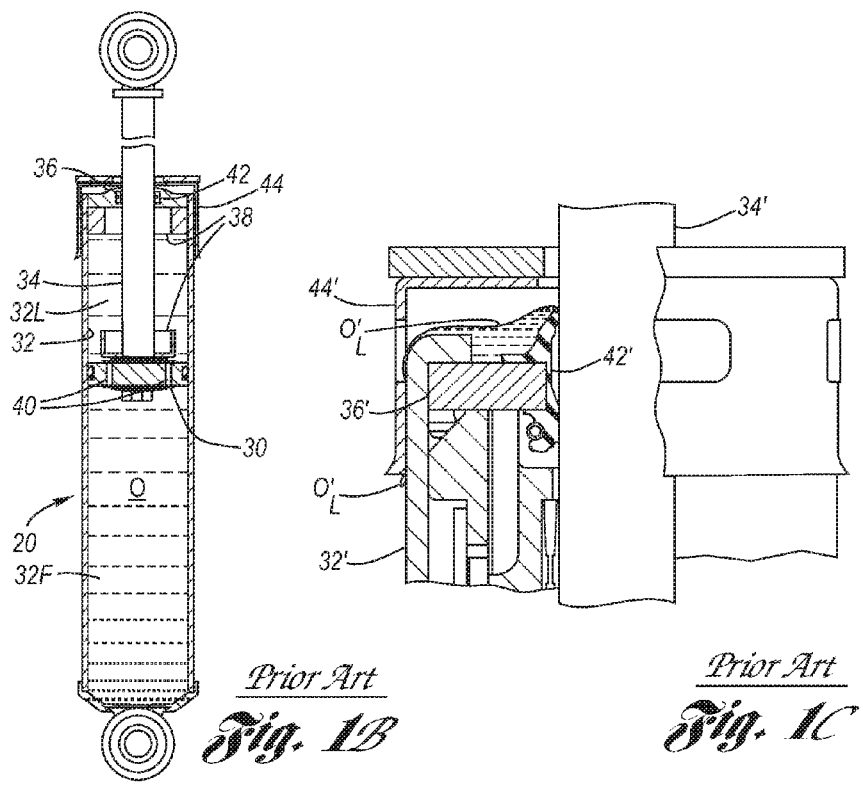
Fig. 1A Prior Art
Fig. 1B Prior Art
Fig. 1C Prior Art

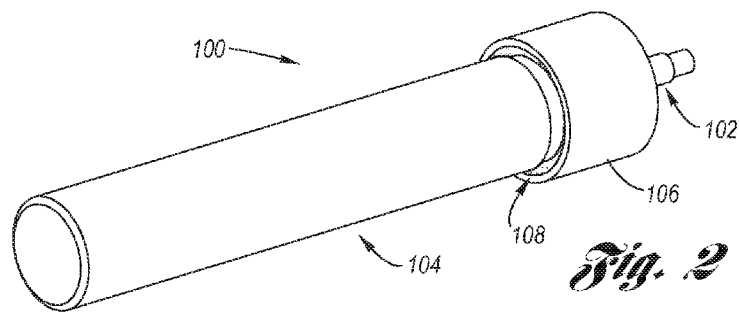
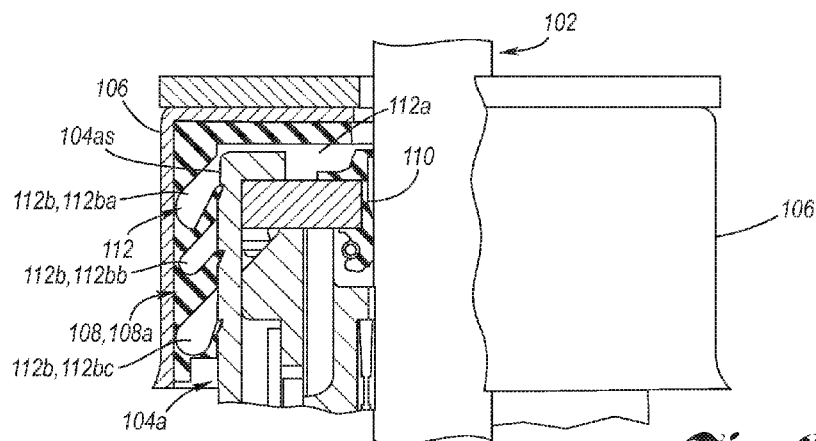
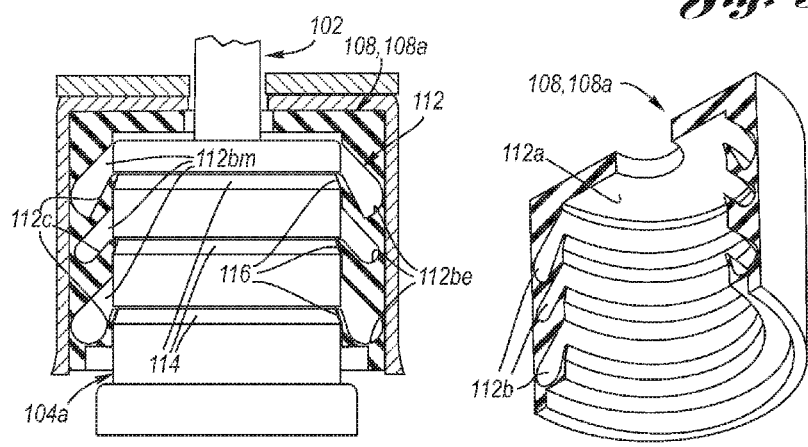
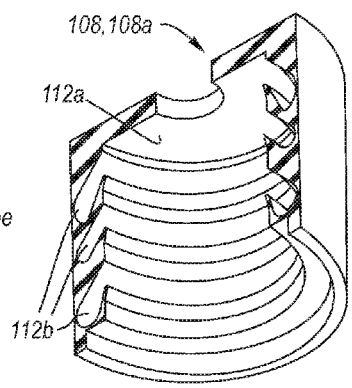

LEAK-PROOF DAMPER HAVING SELF-DIAGNOSTIC FEATURE

TECHNICAL FIELD

The present invention relates to dampers, as for example shock absorbers and struts, commonly used in motor vehicles, and more particularly to a leak-proof damper which provides self-diagnosing of a leaking oil situation indicative of a need of servicing of the damper.

BACKGROUND OF THE INVENTION

Motor vehicle suspension systems are configured so that the wheels are able to follow elevational changes in the road surface as the vehicle travels therealong. When a rise in the road surface is encountered, the suspension responds in "jounce" in which the wheel is able to move upwardly relative to the frame of the vehicle. On the other hand, when a dip in the road surface is encountered, the suspension responds in "rebound" in which the wheel is able to move downwardly relative to the frame of the vehicle. In either jounce or rebound, a spring (i.e., coil, leaf, torsion, etc.) is incorporated at the wheel in order to provide a resilient response to the respective vertical movements with regard to the vehicle frame. However, in order to prevent wheel bouncing and excessive vehicle body motion, a damper (i.e., a shock absorber, strut, etc.) is placed at the wheel to dampen wheel bounce. Additionally, when the limit of jounce is encountered, it is customary to provide a maximum jounce impact absorber in the form of a bumper cushion.

Referring now to FIGS. 1A through 1C, components of a conventional suspension system 10 are depicted which allow for jounce and rebound at a wheel of the subject motor vehicle 12.

Firstly with regard to FIG. 1A, a control arm 14 is pivotally mounted with respect to the frame 16, wherein, in the depicted example, a torsion spring 18 is utilized to provide resilient response for the jounce and rebound of the control arm relative to the frame. To provide control over the rate of jounce and rebound, a damper 20 in the form of a shock absorber is connected pivotally at one end to the frame 16 and connected pivotally at the other end to the control arm 14. Alternatively, a damper in the form of a strut (i.e., a shock absorber and spring combination) may be used in the suspension system, as for example disclosed in U.S. Pat. No. 5,467,971. To provide cushioning in the event a maximum jounce occurs, a jounce bumper cushion 22 is mounted to the frame 16 which is resiliently compressed by movement of the control arm as jounce approaches its maximum.

Referring next to FIG. 1B, the internal components and operational aspects of a conventional damper 20 are schematically depicted. A valved piston 30 is reciprocably movable within a damper cylinder 32. A damper rod 34 is attached to the valved piston 30 and is guided by a damper rod guide 36 at one end of the damper cylinder 32. Below the valved piston 30 and above the damper rod guide 36 is a mutually interacting rebound limiter 38. The instantaneous position of the valved piston 30 within the damper cylinder 32 defines a first interior portion 32F and a second interior portion 32S of the interior of the damper cylinder. In the example depicted at FIG. 1B, the pressurization in the first and second interior portions 32F, 32S is provided by an oil O which is pressurized by pressurized gas, preferably nitrogen. The oil is able to directionally meter through valving 40 of the valved piston 30 in a manner which provides damping. The rod guide 36 carries a rod seal 42 which are covered by an end cap 44.

As can be understood from FIG. 1C, during operation of a damper, the damper rod 34' axially moves with respect to the rod seal 42'. Over time, the rod seal 42' may become damaged, the damper rod 34' may become scratched, or the dimensional fit between the rod seal and the damper rod may have untowardly changed (as for example due to an excessive sideload) such that oil from within the damper cylinder 32' exteriorly passes between the rod seal and the damper rod in the form of leaked oil $O_L'$. The leaked oil $O_L'$ will pass out of the end cap 44' and become visible as drips, etc., whereupon the damper is interpreted as being "bad", requiring replacement. However, in actuality, the mere presence of leaked oil does not necessarily mean the damper needs replacement (i.e., that it is "bad"), in that there may yet remain a fully serviceable amount of oil thereinside. By way of example, it may be possible that between about 3 and 10 percent of the oil volume could leak before the operation of the damper would be compromised.

Thus, there remains in the damper art the problem of determining when leaked oil represents a true problem indicative of the need to replace the damper.

SUMMARY OF THE INVENTION

The present invention is a leak-proof damper which includes an auxiliary oil reservoir to collect leaking oil passing out the rod seal and damper rod interface, wherein the leak-proof damper is self-diagnostic of a need for servicing in that when the volume of leaked oil exceeds the auxiliary oil reservoir volume and becomes externally visible, then an onlooker will know for certain there is presently a need for servicing of the damper.

The leak-proof damper according to the present invention utilizes an auxiliary oil reservoir body disposed externally with respect to the damper cylinder and generally adjacent the rod seal, wherein the auxiliary oil reservoir body is preferably concealed by an end cap. The maximum volume of oil retainable by the auxiliary oil reservoir body is preferably predetermined to coincide with a volume of oil which may be lost from the interior of the damper cylinder and yet the damper will still function properly, as for non-limiting example between about 3 and 10 percent.

Accordingly, in the event oil leaks past the rod seal and damper rod interface, this leaked oil will accumulate in the auxiliary oil reservoir body, and since an onlooker will not observe the leakage oil, there is no chance for a faulty diagnosis that the damper leakage is indicative of a need to replace the damper. However, once the leaked oil volume exceeds the capacity of oil retention by the auxiliary oil reservoir body, then additional leaked oil will escape the auxiliary oil reservoir volume and become visible to an onlooker. Since the visibility of the leaked oil is indicative that the volume of leaked oil now is at the level that the function of the damper is becoming compromised, the visibility of the oil represents a self-diagnostic feature of the leak-proof damper that servicing of the damper is presently required with certainty.

In a first preferred form of the present invention, the auxiliary oil reservoir body is provided by a seal body having an internal oil reservoir cavity which provides the retained oil volume capacity of the auxiliary oil reservoir body. In a second preferred form of the present invention, the auxiliary oil reservoir body is provided by an absorbent body having an absorbency capacity that provides the retained oil volume capacity of the auxiliary oil reservoir body.

Accordingly, it is an object of the present invention to provide a leak-proof damper which includes an auxiliary oil reservoir body to collect leaking oil emanating from the rod seal and damper rod interface; and, further, to provide a self-diagnostic of a certain need for servicing, in that when the volume of leaked oil exceeds the auxiliary oil reservoir volume and becomes externally visible, then the onlooker knows with certainty that there is presently a need for servicing of the damper.

This and additional objects, features and advantages of the present invention will become clearer from the following specification of a preferred embodiment.

BRIEF DESCRIPTION OF THE DRAWINGS

FIG. 1A is a perspective view of an example of a motor vehicle suspension system at a wheel corner of the vehicle.

FIG. 1B is a schematic, sectional view of a prior art damper.

FIG. 1C is a detail, partly sectional view of a prior art damper, showing in particular the damper cylinder, damper rod and rod seal thereof.

FIG. 2 is a perspective view of a leak-proof damper according to the present invention.

FIG. 3 is a detail, partly sectional view of an example of a leak-proof damper according to a first preferred embodiment of the present invention, showing in particular the damper cylinder, damper rod, rod seal and seal body according to the present invention.

FIG. 4 is a detail, partly sectional view of the leak-proof damper of FIG. 3, wherein now the damper cylinder is not sectioned.

FIG. 5 is a perspective, sectional view of the seal body of FIGS. 3 and 4.

DESCRIPTION OF THE PREFERRED EMBODIMENT

Figure 6:
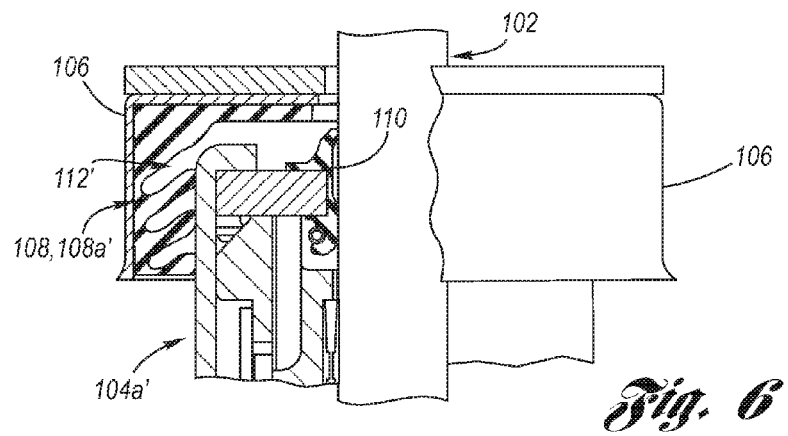
FIG. 6 is a detail, partly sectional view of a leak-proof damper according to an alternate aspect of the first preferred embodiment of the present invention, showing in particular the damper cylinder, damper rod and an alternative seal body configuration according to the present invention.

Referring now to the Drawing, FIGS. 2 through 12B depict various aspects of a leak-proof damper 100 which includes a self-diagnostic feature which provides visual indication of whether or not there is need for servicing, wherein FIGS. 3 through 7C pertain to a first preferred embodiment, and FIGS. 8 through 12B pertain to a second preferred embodiment.

Turning attention firstly to FIG. 2, the leak-proof damper 100 according to the present invention may function as a shock absorber, strut, or otherwise as a damping device for a suspension system. In this regard, a damper rod 102 moves axially in relation to a damper cylinder 104, wherein the internal structure of the damper 100 may be conventional, as for example as that shown at FIGS. 1B and 1C, or otherwise, wherein an oil is utilized within the damper cylinder, and wherein a rod seal (not visible in FIG. 2, but can be understood, by way of example, from the rod seal 110 shown at FIG. 3) retains the oil within the damper cylinder with respect to a sealing interface with the damper rod as the damper rod slides in relation thereto. Within an end cap 106 is disposed an auxiliary oil reservoir body 108 according to the present invention which serves as a repository of leaked oil from the damper cylinder which has untowardly passed through the interface between the rod seal and the damper rod.

According to an aspect of the present invention, the volume of leaked oil which the auxiliary oil reservoir body 108 may retain before oil leaks therefrom is preferably predetermined to equal a volume amount of oil which may be lost from the interior of the damper cylinder and yet the damper operation will not be compromised by the oil loss. Thus, when leaked oil becomes visible to an onlooker (the leaked oil having now escaped the auxiliary oil reservoir body), then this leaked oil visibility provides a self-diagnostic signal that the oil loss from the damper has reached a volume amount that the damper is, with certainty and without doubt, currently in need of servicing.

Referring now to FIGS. 3 through 5, the auxiliary oil reservoir body 108 is in the form of an annular seal body 108a which sealingly abuts the exterior cylinder wall surface 104as of the damper cylinder 104a and is disposed generally adjacent the rod seal 110 of the leak-proof damper. The seal body 108a is preferably composed of an elastomeric or rubber material commonly used for seal applications, and has an oil reservoir cavity 112 formed thereinside which includes an annular upper cavity 112a which adjoins, and fluidically communicates with, the external emergence of the damper rod 102 with respect to its interface with the rod seal 110. The oil reservoir cavity 112 further includes at least one annular blind cavity 112b, preferably at least two blind cavities 112b, each blind cavity 112b being disposed sequentially gravitationally lower having a mouth 112bm which opens at the exterior cylinder wall surface 104as, and each is preferably configured such that the blind end 112be of the blind cavity is disposed at an elevation gravitationally lower than the mouth so as to serve as an oil repository. An uppermost (highest elevation gravitationally) first blind cavity 112ba fluidically communicates with the upper cavity 112a, and each additional blind cavity 112b is disposed gravitationally lower than the first blind cavity in a gravitationally lower sequence. Each blind cavity 112b is separated from each adjacent blind cavity by a respective seal arm 112c which sealingly abuts the external cylinder wall surface 104as and thereby separates the blind cavities from one another.

The external cylinder wall surface 104as has at least one annular groove 114, preferably at least two annular grooves 114, and the seal body 108a has a lip 116 disposed at the distal end of each seal arm 112c, whereby each lip 116 is sealingly seated in a respective groove 114 and serves as a positive sealing interface between the blind cavity 112b thereabove so that leaked oil is stopped from leaking therepast unless the cavity or cavities thereabove are oil filled and now additional leaked oil forces its way therepast. Thus, any leaked oil leaking past the rod seal 110 will initially be retained within the volume of the upper cavity 112a and its adjoining and fluidically communicating first blind cavity 112ba; then progressively fill, in axial succession from the upper cavity, each of the second and third blind cavities 112bb, 112bc, wherein three blind cavities are shown merely by way of non-limiting example. In this regard, the leaked oil passing along the exterior cylinder wall surface will be guided by the lip and groove interaction so as to pass into the next gravitationally lower blind cavity.

FIG. 6 depicts a leak-proof damper similar to that of FIGS. 3 through 5, except now the external cylinder wall surface 104as' of the damper cylinder 104a' has no grooves and the seal body 108a' has no lip at the distal end of each seal arm 112c', wherein operation of the oil reservoir cavity 112' with respect to the is generally similar to that for FIGS. 3 through 5, except the flow of leaked oil alongside the external cylinder wall surface is not guided by the presence of the groove and lip interaction.

Figure 7A:
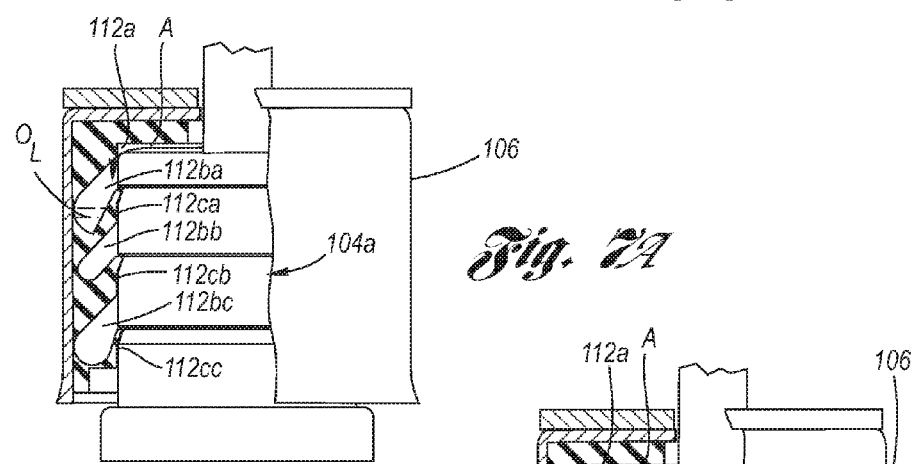
FIGS. 7A through 7C depict partly sectional views similar to FIG. 4, wherein the seal body is shown in operation holding progressively increasing amounts of leaked oil.
Figure 7B:
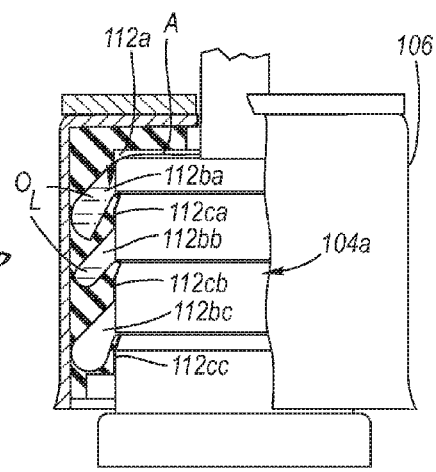
Figure 7C:
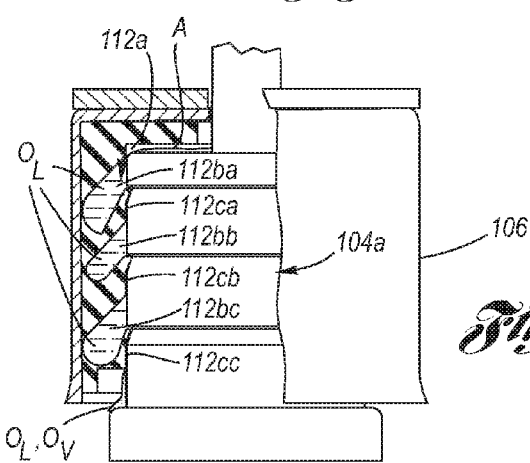

Operation of the first preferred embodiment of the leak-proof damper will now be detailed with additional reference to FIGS. 7A through 7C with respect to the embodiment of FIGS. 3 through 5 elaborated hereinabove.

As the leak-proof damper ages in use, the rod seal 110 may become damaged, the damper rod 102 may become scratched, or the dimensional fit between the rod seal and the damper rod may have untowardly changed (as for example due to an excessive side-load) such that oil from within the damper cylinder 104a exteriorly passes between the rod seal and the damper rod in the form of leaked oil $O_L$. The leaked oil $O_L$ will pass into the oil reservoir cavity 112, initially running along the upper cavity 112a and into the adjoining and fluidically communicating first (uppermost) blind cavity 112ba (see arrow A). Thereafter, as more leaked oil leaks out of the damper cylinder, the leaked oil passes the first seal arm 112ca and fills the second blind cavity 112bb. When the second blind cavity fills with leaked oil, the leaked oil passes the second seal arm 112cb and fills the third blind cavity 112bc. When the leaked oil has reached a volume equal to the volume of the oil reservoir cavity, then the leaked oil will pass the third seal arm 112cc, whereupon the leaked oil will become visible oil $O_V$ which will be apparent to an onlooker.

The volume of the oil reservoir cavity is preferably equal a known volume amount of oil which may be lost from the interior of the damper cylinder and yet the damper operation will not be compromised by the oil loss. Accordingly, when leaked oil $O_L$ becomes visible oil $O_V$ to an onlooker (the leaked oil having escaped the auxiliary oil reservoir body after having filled the oil reservoir cavity), then this visibility provides a self-diagnostic signal that the oil loss from the damper has reached a volume amount that, with certainty and without doubt, the damper is currently in need of servicing.

By way of non-limiting example, if it is determined, as for example by empirical testing, that the damper will operate adequately with a loss of between about 3 and 10 percent of the original oil volume of the damper cylinder, then the oil reservoir cavity 112 would have a corresponding volume of between about 3 and 10 percent of the original oil volume of the damper cylinder.

It is to be understood that the shape and configuration of the oil reservoir cavity can be other than that shown in FIGS. 3 through 6, which is merely exemplary, and may selected to suit any particular application of damper to provide the appropriate volume of leaked oil retention.

Figure 8:
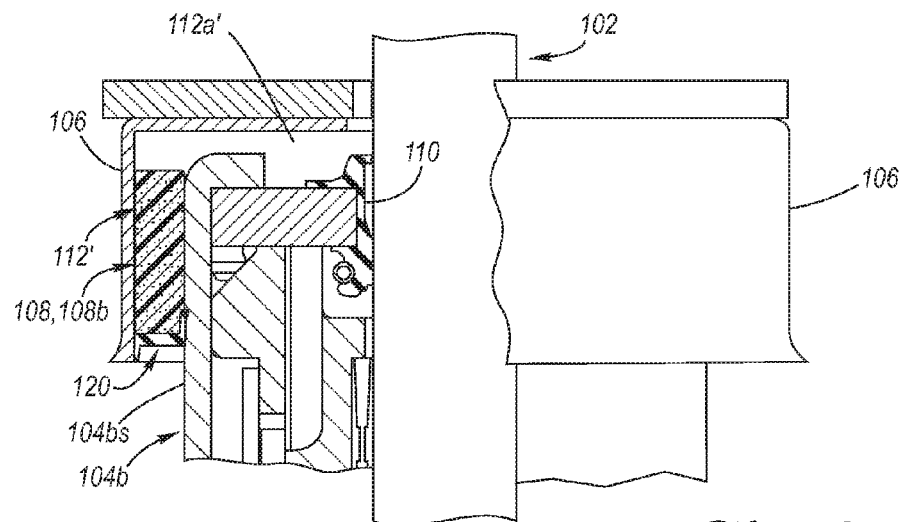
FIG. 8 is a detail, partly sectional view of an example of a leak-proof damper according to a second preferred embodiment of the present invention, showing in particular the damper cylinder, damper rod, rod seal and absorbent body according to the present invention.
Figures 9, 10:
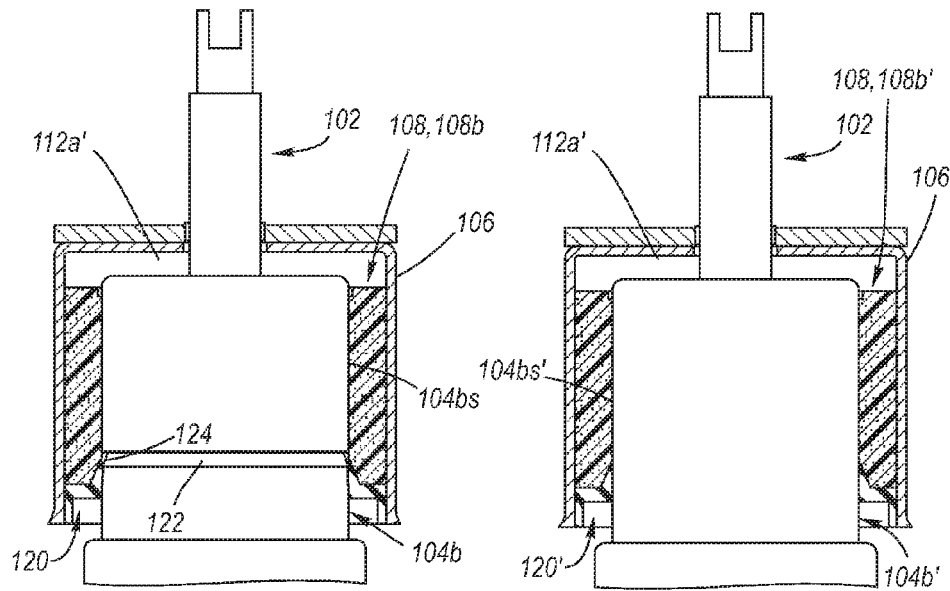
FIG. 9 is a detail, partly sectional view of the leak-proof damper of FIG. 8, wherein now the damper cylinder is not sectioned.
FIG. 10 is a detail, partly sectional view of a leak-proof damper according to a first alternate aspect of the second preferred embodiment of the present invention, showing in particular the damper cylinder, damper rod and alternative absorbent body configuration according to the present invention.

Referring now to FIGS. 8 and 9, the auxiliary oil reservoir body 108 is in the form of an annular absorbent body 108b which sealingly abuts the exterior cylinder wall surface 104s''' of the damper cylinder 104" on one side and preferably abuts the end cap 106 on the other, opposite side. The absorbent body 108b is disposed adjacent the rod seal 110 of the leak-proof damper. The absorbent body 108b has an absorbency capacity of oil which volumetrically corresponds to an equivalent of an oil reservoir cavity 112'. The absorbent material may be any suitable composition, for example including absorbent sponge and sponge-like materials and absorbent paper and paper-like materials. An annular upper cavity 112a' adjoins, and fluidically communicates with, the interface of the external emergence of the damper rod 102 with respect to the rode seal 110 and the damper cylinder 104b, as well as with the absorbent body 108b. In this regard, any leaked oil passing through the interface between the rod seal 110 and the damper rod 102 will initially pass into the volume of the upper cavity 112a' and then be absorbed into the absorbent body 108b (see arrow B).

The absorbent body 108b is preferably supplemented, below the lowermost portion thereof, by an annular retention seal 120 which serves to ensure prevention of dripping of leaked oil out of the absorbent body when the absorbent body approaches an oil saturated condition, but is not yet fully filled with oil to its ultimate oil absorbency capacity. In this regard, the external cylinder wall surface 104bs has an annular groove 122 and the retention seal has a lip 124 which is sealingly seated in the groove, and serves as a positive sealing interface as between the retention seal and the external cylinder wall surface. The retention seal is provided so that leaked oil is stopped from leaking therepast unless the absorbent material has reached its limit of absorbency and now additional leaked oil forces its way therepast.

FIG. 10 depicts a leak-proof damper similar to that of FIGS. 8 and 9, except now the external cylinder wall 104bs' of the damper cylinder 104b' has no groove and the retention seal 120' has no lip, wherein operation of the absorbent body 108b and retention seal are generally similar to that for FIGS. 8 and 9, except the flow of leaked oil alongside the external cylinder wall surface is not guided by the presence of the groove and lip interaction.

Figure 11:
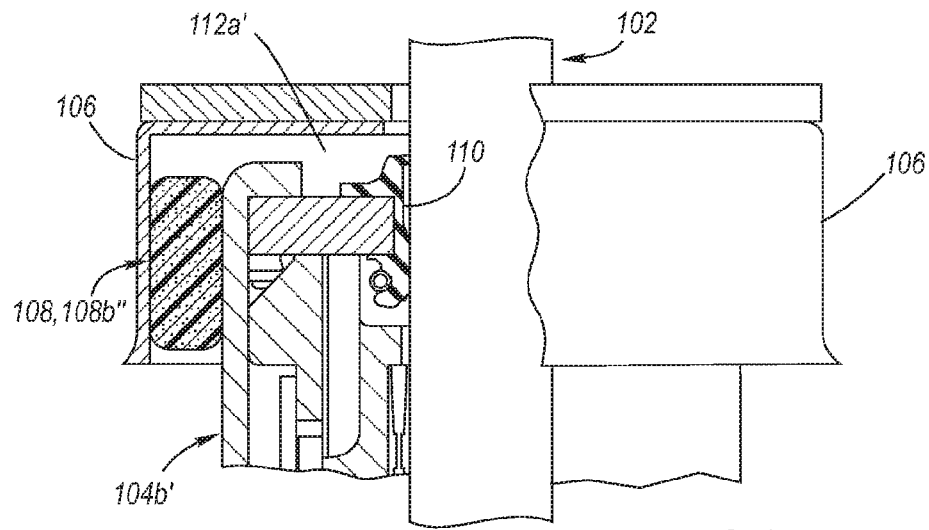
FIG. 11 is a detail, partly sectional view of a leak-proof damper according to a second alternate aspect of the second preferred embodiment of the present invention, showing in particular the damper cylinder, damper rod and alternative absorbent body configuration according to the present invention.

FIG. 11 depicts a leak-proof damper similar to that of FIGS. 8 and 9, except now there is present no retention seal and the external cylinder wall of the damper cylinder 104b" has no groove. While operation of the absorbent body 108" is generally similar to that for FIGS. 8 and 9, the absorbency of the absorbent body is solely relied upon to retain leaked oil.

Figures 12A, 12B:
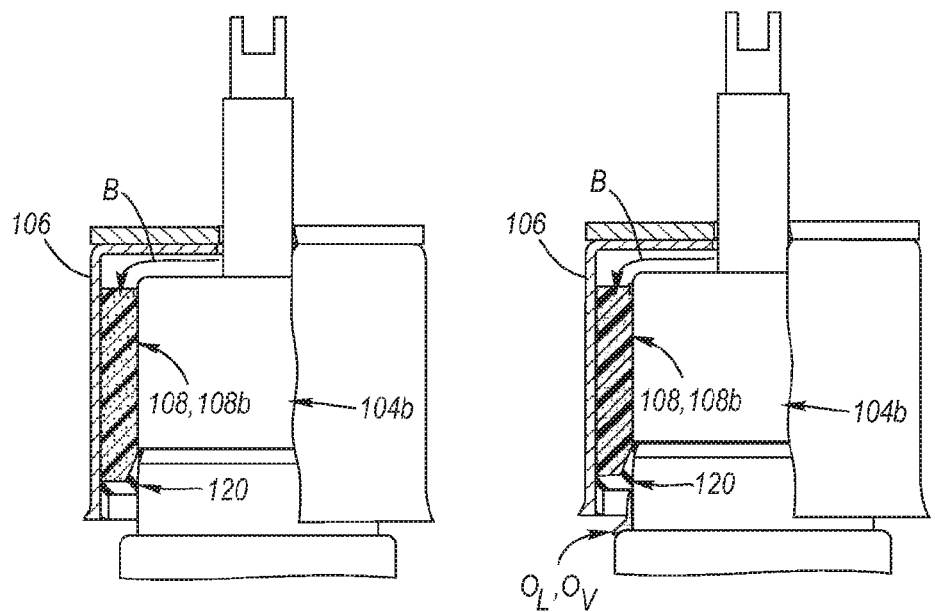
FIGS. 12A and 12B depict partly sectional views similar to FIG. 9, wherein the absorbent body is depicted in operation holding progressively increasing amounts of leaked oil.

Operation of the second preferred embodiment of the leak-proof damper will now be detailed with additional reference to FIGS. 12A and 12B with respect to the embodiment of FIGS. 8 and 9 elaborated hereinabove.

As the leak-proof damper ages in use, the rod seal 110 may become damaged, the damper rod 102 may become scratched, or the dimensional fit between the rod seal and the damper rod may have untowardly changed (as for example due to an excessive side-load) such that oil from within the damper cylinder 104' exteriorly passes between the rod seal and the damper rod in the form of leaked oil $O_L$. The leaked oil $O_L$ will pass initially along the upper cavity 112a' and then pass absorbingly into the absorbent body 108b. As more leaked oil leaks out of the damper cylinder, the leaked oil continues to be absorbed by the absorbent body until it reaches absorbency saturation, being further retained by sealing operation of the retention seal 120, whereupon the leaked oil has reached a volume equal to the volume of the oil reservoir cavity, then the leaked oil will now leak out of the absorbent body and past the retention seal so that now the leaked oil $O_L$ will become visible oil $O_V$ to an onlooker.

The volume of the oil reservoir cavity (which is the absorbency limit of the absorbent material plus any cavity present above (i.e., the upper cavity) and below (i.e., spacing to the retention seal) is preferably equal a known volume amount of oil which may be lost from the interior of the damper cylinder and yet the damper operation will not be compromised by the oil loss. Accordingly, when leaked oil becomes visible oil $O_V$ to an onlooker (the leaked oil having now escaped the auxiliary oil reservoir body after having filled the oil reservoir cavity), then this visibility provides a self-diagnostic signal that the oil loss from the damper has reached a volume amount that, with certainty and without doubt, the damper is currently in need of servicing.

By way of non-limiting example, if it is determined, as for example by empirical testing, that the damper will operate adequately with a loss of between about 3 and 10 percent of the original oil volume of the damper cylinder, then the oil reservoir cavity (the absorbency limit and any adjoining cavities) would have a corresponding volume of between about 3 and 10 percent of the original oil volume of the damper cylinder.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A leak-proof damper, comprising:
   a damper cylinder having an external cylinder wall surface;
   an oil disposed in said damper cylinder;
   a damper rod disposed partly in said damper cylinder and reciprocally moveable with respect thereto;
   a rod seal connected with said damper cylinder, said rod seal abutting said damper rod at an interface of said rod seal with said damper rod; and
   an auxiliary oil reservoir body disposed in annular abutment with respect to said external cylinder wall surface, said auxiliary oil reservoir body being located substantially adjacent said rod seal and in fluidic communication with the interface of said rod seal with said damper rod, said auxiliary oil reservoir body having an oil retention volume;
   wherein if the oil leaks past the interface of said rod seal with said damper rod, then the leaked oil is retained by the auxiliary reservoir body until said oil retention volume is reached;
   wherein if not more than a predetermined volume of the oil leaks past the interface, the damper functions substantially as compared to function of the damper without any oil leakage, but if more than the predetermined volume leaks past the interface, then function of the damper becomes compromised such that with certainty the damper is in need of servicing;
   wherein said oil retention volume of said auxiliary oil reservoir body is substantially equal to said predetermined volume;
   wherein if a volume of the leaked oil exceeds said oil retention volume, then said leaked oil passes out of said auxiliary oil reservoir body to a location external with respect to the damper such that the leaked oil becomes visible to an onlooker of the damper;
   wherein if the leaked oil is visible, then the visible leaked oil is indicative that the damper has become compromised such that with certainty the damper is in need of servicing;
   wherein said auxiliary oil reservoir body comprises a seal body, said seal body having an oil reservoir cavity formed therein which is in fluidic communication with the interface of said rod seal with said damper rod; and
   wherein said oil reservoir cavity comprises:
      an upper cavity which is in fluidic communication with the interface of said rod seal with said damper rod; and
      a first blind cavity disposed at an elevation gravitationally lower than said upper cavity when said damper is disposed axially upright, said first blind cavity fluidically communicating with said upper cavity; said first blind cavity comprising:
         a first mouth adjacent said external cylinder wall surface;
         a first blind end oppositely disposed said first mouth; and
         a first seal arm abutting said external cylinder wall surface;
         wherein said first blind end is disposed at an elevation gravitationally lower than is said first mouth when said damper is disposed axially upright.

2. The leak-proof damper of claim 1, further comprising an end cap into which is received said seal body; wherein the visible leaked oil is disposed externally in relation to said end cap.

3. The leak-proof damper of claim 1, further comprising:
   at least one additional blind cavity disposed gravitationally lower than said first blind cavity when said damper is disposed axially upright.

4. The leak-proof damper of claim 3, wherein said at least one additional blind cavity comprises:
   a first additional blind cavity comprising:
      a second mouth adjacent said external cylinder wall surface;
      a second blind end oppositely disposed said second mouth; and
      a second seal arm abutting said external cylinder wall surface;
      wherein said second blind end is disposed at an elevation gravitationally lower than is said second mouth when said damper is disposed axially upright; and
   a second additional blind cavity comprising:
      a third mouth adjacent said external cylinder wall surface;
      a third blind end oppositely disposed said third mouth; and
      a third seal arm abutting said external cylinder wall surface;
      wherein said third blind end is disposed at an elevation gravitationally lower than is said third mouth when said damper is disposed axially upright.

5. The leak-proof damper of claim 4, further comprising an end cap into which is received said seal body; wherein the visible leaked oil is disposed externally in relation to said end cap.

6. The leak-proof damper of claim 4, further comprising:
   a lip disposed at a distal end of said seal arm; and
   an annular groove formed in said external cylinder wall surface, wherein said lip is seatingly disposed in said groove.

7. The leak-proof damper of claim 6, further comprising an end cap into which is received said seal body; wherein the visible leaked oil is disposed externally in relation to said end cap.

* * * * *